United States Patent
Or et al.

(10) Patent No.: US 7,410,039 B2
(45) Date of Patent: Aug. 12, 2008

(54) TUNABLE VIBRATION ABSORPTION DEVICE

(75) Inventors: Siu Wing Or, Hong Kong (HK); Lai Wa Helen Chan-Wong, Hong Kong (HK); Ping Kong Joseph Choy, Hong Kong (HK); Chou Kee Peter Liu, Hong Kong (HK)

(73) Assignee: ASM Assembly Automation Ltd., Hong Kong (HK)

( * ) Notice: Subject to any disclaimer, the term of this patent is extended or adjusted under 35 U.S.C. 154(b) by 178 days.

(21) Appl. No.: 11/051,155

(22) Filed: Feb. 4, 2005

(65) Prior Publication Data

US 2006/0175169 A1  Aug. 10, 2006

(51) Int. Cl.
    *F16F 7/10* (2006.01)
(52) U.S. Cl. .................. 188/380; 188/267; 188/378; 267/136
(58) Field of Classification Search ............. 188/380, 188/378, 379, 266.7, 267; 267/136, 140.11; 310/26; 248/550, 560, 562
See application file for complete search history.

(56) References Cited

U.S. PATENT DOCUMENTS

| | | | | |
|---|---|---|---|---|
| 5,020,781 A | * | 6/1991 | Huang | 267/136 |
| 5,337,864 A | * | 8/1994 | Sjostrom | 188/378 |
| 5,427,347 A | * | 6/1995 | Swanson et al. | 267/140.14 |
| 5,437,525 A | * | 8/1995 | Bras | 411/14 |
| 5,456,341 A | * | 10/1995 | Garnjost et al. | 188/378 |
| 5,713,438 A | * | 2/1998 | Rossetti et al. | 188/378 |
| 5,906,254 A | * | 5/1999 | Schmidt et al. | 188/378 |
| 6,009,985 A | * | 1/2000 | Ivers | 188/380 |
| 6,193,206 B1 | * | 2/2001 | Yasuda et al. | 248/550 |
| 6,196,529 B1 | * | 3/2001 | Shtarkman et al. | 267/140.14 |
| 6,451,131 B1 | * | 9/2002 | Tai et al. | 148/301 |
| 6,681,908 B2 | | 1/2004 | Davis | 188/380 |
| 7,113,064 B2 | * | 9/2006 | Loubat et al. | 335/220 |
| 2002/0060268 A1 | | 5/2002 | Smith et al. | |
| 2005/0281391 A1 | * | 12/2005 | Luo et al. | 378/204 |

FOREIGN PATENT DOCUMENTS

CN  2621239 Y  6/2004
JP  63-92851 A * 4/1988 ................. 248/562

OTHER PUBLICATIONS

English translation of Office Action issued by P.R. Chinese Patent Office, dated Apr. 11, 2008 in connection with corresponding Chinese Application.

* cited by examiner

*Primary Examiner*—Robert A. Siconolfi
*Assistant Examiner*—Mariano Sy
(74) *Attorney, Agent, or Firm*—Ostrolenk, Faber, Gerb, & Soffen, LLP

(57) ABSTRACT

A tunable vibration absorption device is provided that is suitable for active or semi-active vibration absorption or damping of vibrations in vibrating structures. It comprises a stack including a force actuator mechanism for generating an axial actuation force and a force sensor mechanism which is responsive to an external force acting on the stack to generate a force signal. A controller unit is electrically connected to the force sensor mechanism for receiving the force signal generated by the force sensor mechanism, and it is also electrically connected to the force actuator mechanism for adjusting the axial actuation force generated by the force actuator mechanism in response to the received force signal generated by the force sensor mechanism.

18 Claims, 6 Drawing Sheets

TUNABLE VIBRATION ABSORPTION DEVICE

FIELD OF THE INVENTION

The invention relates to vibration absorption or damping devices, and in particular to vibration absorption or damping devices that provide active or semi-active vibration absorption or damping of vibrations in vibrating structures.

BACKGROUND AND PRIOR ART

Tuned vibration absorption devices are usually tuned mass dampers comprising predetermined sets of passive masses and passive damped springs to reduce the susceptibility to vibration of a structure. In these pre-tuned passive vibration absorption devices, the operational frequency (that is, the resonance frequency) of the devices remains unchanged once the devices are designed and fabricated.

In the prior art, tunable vibration absorption devices are typically tunable mass dampers (or adjustable tuned mass dampers) comprising sets of passive masses and adjustable damped springs such that tuning of the operational frequency of the devices is achieved manually by adjusting the stiffness of the springs through some mechanical means.

Advanced tunable vibration absorption devices are generally fabricated using smart materials (also called active, intelligent or adaptive materials) as the principal tuning means to provide the distinct features of tunable stiffness via an external tuning signal. With such tuning means, one may easily and precisely adjust the operational or resonance frequency of such devices to optimally match the targeted resonance frequency of the corresponding under-damped vibrating structures so that an additional damping can be properly introduced to the vibrating structures.

Examples of smart materials mainly include piezoelectric and magnetostrictive materials. The observed tunable stiffness (and hence the operational frequency) of the smart material-based tunable vibration absorption devices originate from an external field-induced characteristic property change of the smart material elements (that is, their stiffness) as well as the cooperative property change of the devices as a whole. Hence, the tunability and controllability of the stiffness (and hence the operational frequency) of the devices play an important factor in absorbing or damping vibrational energy.

If the vibration absorption devices are not tunable or if the tunability and controllability of the stiffness of the tunable vibration absorption devices are not sufficiently high such that the stiffness of the devices cannot be properly optimized for the vibrating structures, installing such devices onto the vibrating structures may result in the direct transmission of vibrational energy from the structures to the devices without experiencing any energy absorption or damping effect. In the worst cases, the vibration level of the vibrating structures may further be enhanced. Consequently, the advantages of deploying tunable vibration absorption devices, in particular smart material-based tunable vibration absorption devices, onto vibrating structures are two-fold: first, their nature of tunable stiffness enables their operational frequency to easily and optimally match the targeted resonance frequency of under-damped vibrating structures without adding any external mass; second, their nature of having a reasonably high damping ratio enables a wider range structural applications without adding any external or extra absorption or damping means, such as damped springs.

Nonetheless, while smart material-based tunable vibration absorption devices are more effective and useful as compared with traditional tuned and tunable (or adjustable tuned) vibration absorption devices (i.e., tuned and tunable (or adjustable tuned) mass dampers), these state-of-the-art devices typically suffer from several shortcomings. For example, they acre only provided with a vibrational energy absorption function through external tuning of the characteristic properties of the smart material elements. Hence, they are only limited to a semi-active (or an open-loop) mode of operation, where a predetermined or a manually-tuned input signal is applied to the smart material elements of the devices without the assistance of any automatic control system. If an active (or a closed-loop) mode of operation is necessary, at least one separate sensor (such as an accelerometer or a force sensor) is required to gather the so-called "predetermined" or "manual-tuned" input signal. Thus, separate sensors have to be installed together with the devices. It is clear that measurement cost and complexity will inevitably increase. Another shortcoming of this approach is that, in practice, it is quite difficult to reliably co-locate both the devices and separate sensors. Accordingly, discrepancy between a sensor output signal and an actual structural vibration may occur.

Prior art tunable vibration absorption devices can generally only provide uni-directional tuning of the operational frequency (which is related to the stiffness). In particular, they work well in a high frequency regime as the frequency tuning elevates from a specific frequency value defined by an off-state natural frequency of the devices. Besides the characteristic property (such as stiffness) of the smart material elements in the devices, the operational frequency of these devices depends heavily on the whole structure of the devices. Thus, state-of-the-art designs have to incorporate a number of structural components so as to provide a less sensitive mounting means for connection with the vibrating structures.

A prior art tunable vibration absorption device is described in U.S. Pat. No. 6,681,908 for an "Adjustable Tuned Mass Damper". This invention teaches a tuned mass damper which is tunable by manually adjusting a spring stiffness of the damper through a screw connected to the spring. Rotating the screw changes the spring stiffness and thereby the natural resonance frequency of the mass and spring combination. Although this design is quite simple, manual and mechanical tunings make the damper difficult to integrate with electrical or automated control systems. If the design is to be modified for electrical or automated tuning, the patent suggests inclusion of a separate accelerometer. As explained above, this will, amongst other things, increase the cost and complexity of the damper.

Another prior art tunable vibration absorption device is described in U.S. Patent Publication No. 2002/0060268 entitled, "Method and Apparatus for Improved Vibration Isolation". It teaches a vibration isolator that is tunable through electrically adjusting the motion of an enclosed fluid mass through a piezoelectric actuation pump so as to cancel a frequency of oscillatory forces from a vibrating structure. This design of vibration isolator is undesirably complex to manufacture on an industrial scale and its reliance on adjusting the motion of a fluid mass to counter external oscillatory forces makes it difficult to monitor the electrical or automated tuning in practice.

SUMMARY OF THE INVENTION

It is therefore an object of the invention to provide an improved tunable vibration absorption or damping device that is capable of automated or semi-automated tuning, and has a simpler design that is effective and easier to manufacture as compared with prior art devices.

It is another object of the invention to provide a smart vibration absorption or damping device with an embedded sensing capability for in-situ monitoring and automated control purposes.

Accordingly, the invention provides a tunable vibration absorption device comprising: a stack including a force actuator mechanism for generating an axial actuation force and a force sensor mechanism which is responsive to an external force acting on the stack to generate a force signal; and a controller unit electrically connected to the force sensor mechanism for receiving the force signal generated by the force sensor mechanism, wherein the controller unit is also electrically connected to the force actuator mechanism for adjusting the axial actuation force generated by the force actuator mechanism in response to the received force signal generated by the force sensor mechanism.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

Examples of preferred embodiments of tunable vibration absorption devices in accordance with the invention will now be described with reference to the accompanying drawings, in which.

DETAILED DESCRIPTION OF THE PREFERRED EMBODIMENTS OF THE INVENTION

Figure 1:
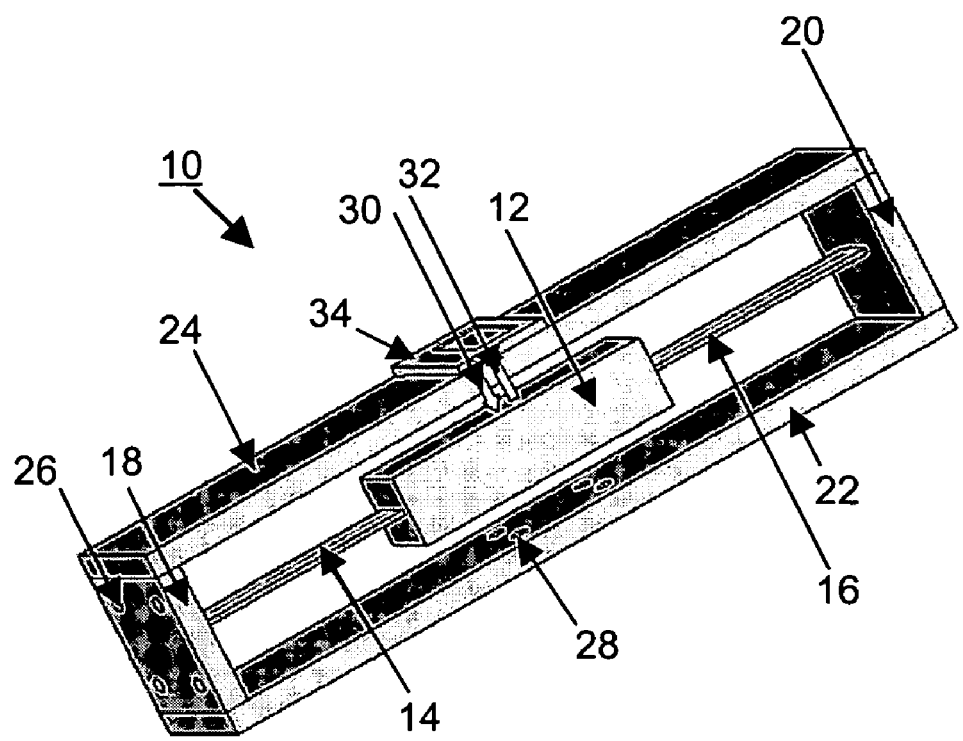
FIG. 1 is an isometric view of a tunable vibration absorption device comprising a rigid frame and a force actuator and sensor unit according to the invention.

Various embodiments of tunable vibration absorption devices according to the present invention are hereinafter described with reference to the drawings. However, the invention is not limited to such embodiments illustrated in the drawings.

FIG. 1 is an isometric view of a tunable vibration absorption device 10 comprising a rigid support, which may be in the form of a rigid frame, and a force actuator and sensor unit 12 comprising a force actuator mechanism and a force sensor mechanism according to the invention. The force actuator and sensor unit 12 may preferably be connected to the rigid frame by one or more resilient links coupled to axial ends of the unit 12, such as two flexible transverse beams 14, 16. The force actuator and sensor unit 12 mainly provides three functions: first, it serves as a mass and damping means; second, it serves as an actuation means for providing an axial actuation force to the transverse beams 14, 16; and third, it serves as a sensing means for monitoring the amount of the axial actuation force exerted on the transverse beams 14, 16. The transverse beams 14, 16 support the force actuator and sensor unit 12 and serve as springs that are relatively sensitive in the transverse direction to the axial actuation force generated by the force actuator and sensor unit 12 but relatively insensitive in directions parallel to the axial actuation force.

The rigid frame consists of rigid plates 18, 20, 22, 24 that enclose the force actuator and sensor unit 12. The rigid plates 18, 20, 22, 24 may also be provided with mounting means, such as vertical mounting holes 26 and horizontal mounting holes 28 for connecting and installing the tunable vibration absorption device 10 to an under-damped structure (not shown) to be damped. The materials of the transverse beams 14, 16 and rigid plates 18, 20, 22, 24 are preferably but not exclusively metallic materials, such as stainless steels, titanium alloys, aluminum alloys, or the like. A controller unit 34 is attached to a rigid plate 24 of the rigid frame and is electrically connected to the force actuator and sensor unit 12 through signal cables 30, 32. The controller unit 34 serves to receive a force signal generated by the force sensor mechanism, and adjust an axial actuation force generated by the force actuator mechanism in response to the received force signal generated by the force sensor mechanism.

Figure 2:
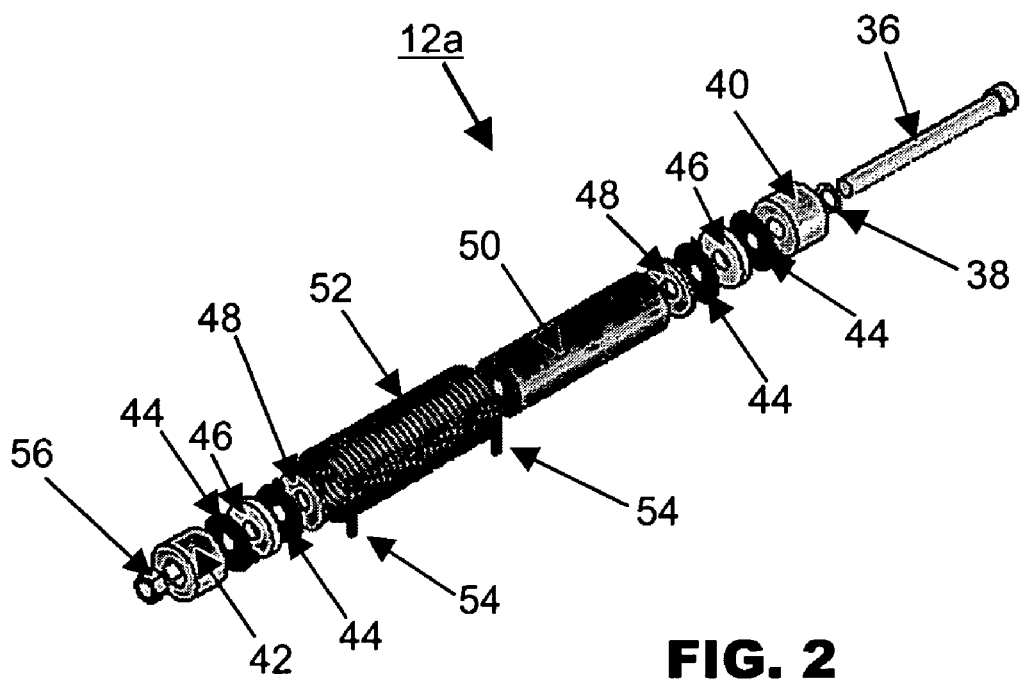
FIG. 2 is an exploded isometric view showing the components of a force actuator and sensor unit according to a first preferred embodiment of the invention.

FIG. 2 is an exploded isometric view showing the components of a force actuator and sensor unit 12a according to a first preferred embodiment of the invention. The force actuator and sensor unit 12a comprises a stack of components, including a force actuator mechanism for generating an axial actuation force and a force sensor mechanism which is responsive to an external force acting on the stack to generate a force signal.

Specifically, the components of the force actuator and sensor unit 12a comprise a bolt 36, a washer 38, two rigid end plates 40, 42, copper foils 44 sandwiching a pair of sensors 46, two pieces of insulation layers 48, an actuator in the form of a rod or bar 50, a coil 52 with two leads 54 enclosing the actuator 50, and a nut 56. The actuator 50 is made of magnetostrictive materials, which are preferably but not exclusively magnetostrictive alloys, such as terbium-dysprosium-iron alloy (Terfenol-D), gallium-iron alloy (Gafenol), samarium-dysprosium-iron alloy (Samfenol-D), or the like. The actuator 50 preferably consists of an internal magnetization direction oriented along the axial direction of the force actuator and sensor unit 12a comprised in the stack. The sensors 46 are made of piezoelectric materials, which are preferably but not exclusively piezoelectric ceramics, such as lead zirconate titanate (PZT), barium titanate (BaTiO$_3$), lead magnesium niobate-lead titanate (PMN—PT), lead zirconate niobate-lead titanate (PZN—PT), or the like. The sensors 46 preferably consist of an internal polarization direction oriented along the axial direction of the force actuator and sensor unit 12a comprised in the stack. The insulation layers 48 are made of polymeric materials, which are preferably but not exclusively polyimide.

The actuator 50, the coil 52 surrounding the actuator 50 and the coil's leads 54 form the force actuator mechanism of the force actuator and sensor unit 12a that is magnetically driven by a DC signal from the controller unit 34 through a magnetic field generated by the coil 52. The copper foils 44, sensors 46 and insulation layers 48 form the force sensor mechanism of the force actuator and sensor unit 12a that is used to monitor the change in the axial actuation force acting on the beams 14, 16. The first sensor 46 is located next to an axial end of the force actuator mechanism and the second sensor 46 is located next to an opposite axial end of the force actuator mechanism.

Figure 3:
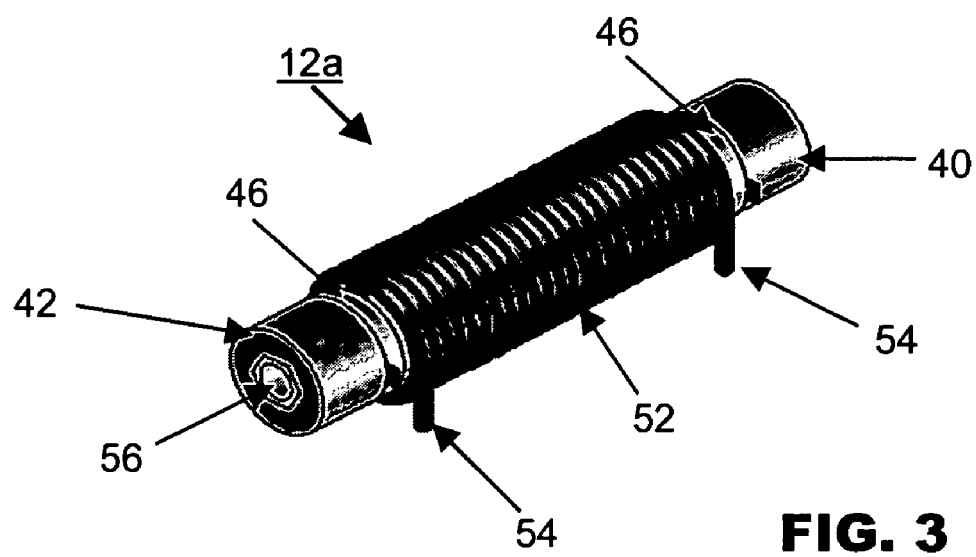
FIG. 3 is an isometric view of the force actuator and sensor unit assembled from the components illustrated in FIG. 2.
Figure 4:
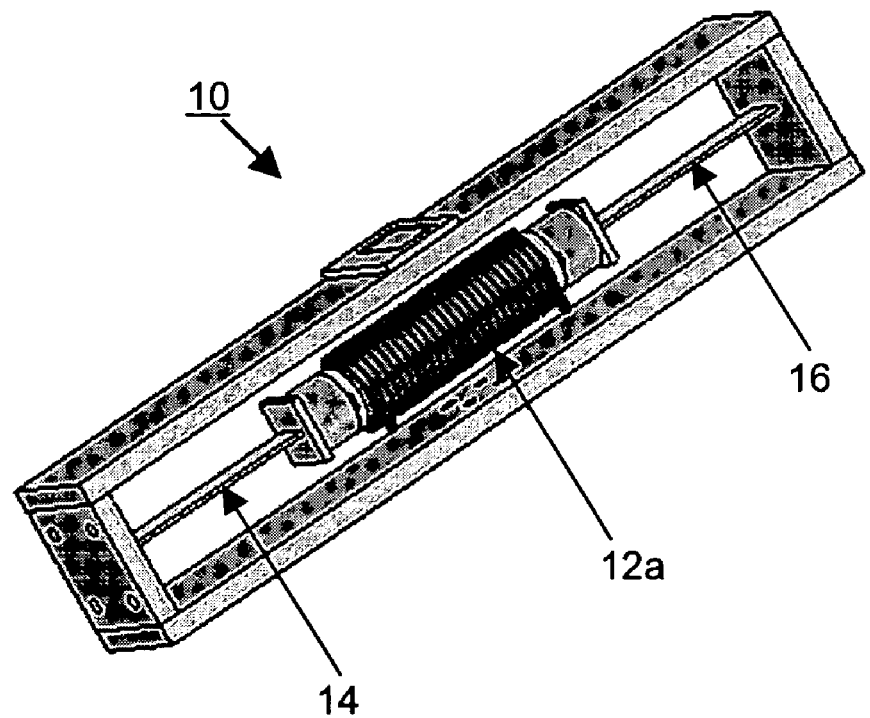
FIG. 4 is an isometric view of a tunable vibration absorption device including the force actuator and sensor unit of FIG. 3 enclosed in a rigid frame.

The controller unit 34 monitors the axial actuation force signal produced by the force sensor mechanism and tunes the force actuator mechanism accordingly through adjustment signals. The two rigid end plates 40, 42 are used to protect the sensors 46 from damage and to provide connection interfaces between the transverse beams 14, 16 and the force actuator mechanism and force sensor mechanism. A compression assembly, which may be in the form of the bolt 36, washer 38, and nut 56 together compress the stack of components and provide a preload force to the actuator 50. The components comprised in the force actuator mechanism and force sensor mechanism preferably have holes therethrough in order to extend the bolt 36 through these holes, and the nut 56 is then used to secure the components to the bolt 36. FIG. 3 is an isometric view of the force actuator and sensor unit 12a assembled from the components illustrated in FIG. 2, and FIG. 4 is an isometric view of a tunable vibration absorption device 10 including the force actuator and sensor unit 12a of FIG. 3 enclosed in a rigid frame.

The force actuator and sensor unit 12a is "smart" in that it is capable of providing an adaptive means for vibration energy absorption by monitoring in-situ the vibration of the structure to be damped. The force sensor mechanism detects the vibration feedback and conveys this information to the controller unit 34. From the feedback, the controller unit 34 may tune the force actuator mechanism accordingly. Therefore, active vibration absorption or damping is possible.

Further, the force sensor mechanism also acts as a convenient means for manually tuning the device to absorb the vibrational energy from the structure through monitoring the output of the force sensor mechanism for semi-active vibration absorption or damping. The design has a simpler structure to provide vibration absorption while sensing the vibration.

The operation of this "smart" tunable vibration absorption device 10 is based upon the sensitivity of the transversal bending stiffness and resonance frequency of the two transverse beams 14, 16 in response to their axial actuation force as supplied by the force actuator mechanism of the force actuator and sensor unit 12a. These parameters are adjusted through changing the magnitude of an input tuning signal to the force actuator mechanism of the force actuator and sensor unit 12a such that the force actuator mechanism expands and exerts the corresponding compressive axial actuation force at one end of each transverse beam 14, 16, thereby reducing the transversal bending stiffness of the transverse beams 14, 16 and hence the operational or resonance frequency of the "smart" tunable vibration absorption device 10. The variation of the axial actuation force and thus the transversal bending stiffness and resonance frequency are automatically monitored by the force sensor mechanism so as to achieve a closed-loop mode of operation. It is noted that when the targeted resonance frequency of the corresponding under-damped vibrating structure (not shown) is reached, the output of the force sensor mechanism is at maximum, indicating that the "smart" tunable vibration absorption device 10 is at resonance and has absorbed or damped the vibrational energy of the vibrating structure.

Figure 5:
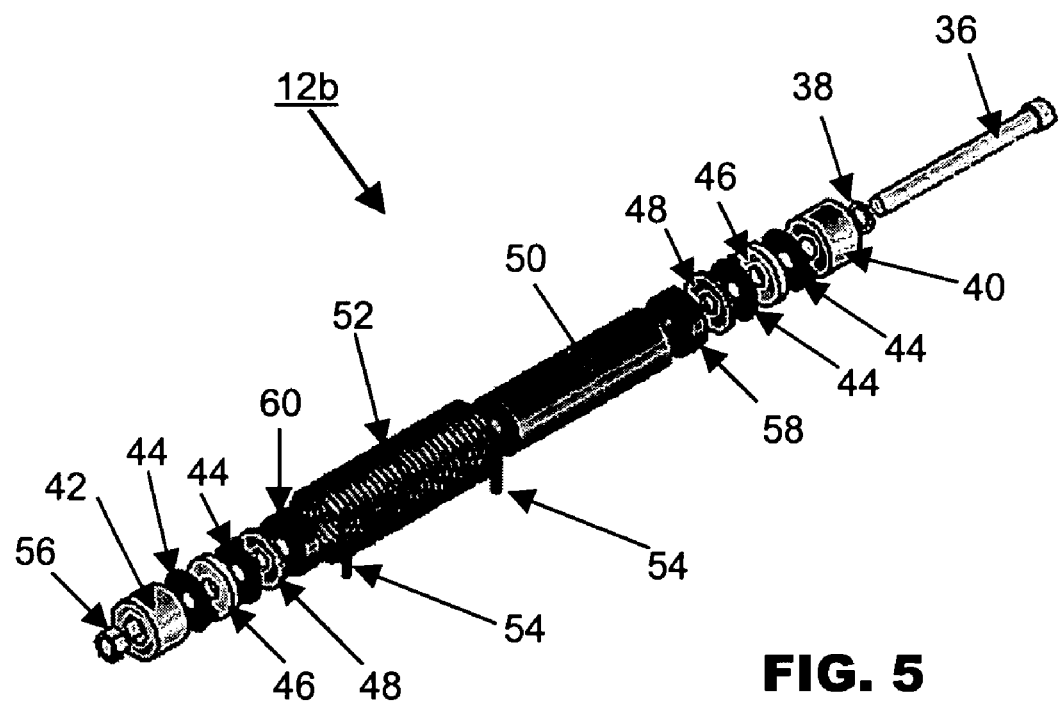
FIG. 5 is an exploded isometric view showing the components of a force actuator and sensor unit according to a second preferred embodiment of the invention.

FIG. 5 is an exploded isometric view showing the components of a force actuator and sensor unit 12b according to a second preferred embodiment of the invention. The components of the force actuator and sensor unit 12b are a bolt 36, a washer 38, two rigid end plates 40, 42, copper foils 44 sandwiching a pair of sensors 46, two pieces of insulation layers 48, magnetic materials such as permanent magnets 58, 60, an actuator in the form of a rod or bar 50, a coil 52 with two leads 54 enclosing the actuator 50, and a nut 56. The actuator 50 is made of magnetostrictive materials, which are preferably but not exclusively magnetostrictive alloys, such as Terfenol-D, Gafenol, Samfenol-D, or the like.

The actuator 50 preferably consists of an internal magnetization direction oriented along the axial direction of the force actuator and sensor unit 12b. The sensors 46 are made of piezoelectric materials, which are preferably but not exclusively piezoelectric ceramics, such as PZT, $BaTiO_3$, PMN—PT, PZN—PT, or the like. The sensors 46 preferably consist of an internal polarization direction oriented along the axial direction of the force actuator and sensor unit 12b. The insulation layers 48 are made of polymeric materials, which are preferably but not exclusively polyimide. The permanent magnets 58, 60 are preferably but not exclusively monolithic sintered or polymer-bonded neodymium iron boron (NdFeB) and samarium cobalt (SmCo) magnets. Sintered magnets have higher magnetic properties and better thermal stability, while polymer-bonded magnets provide higher electrical resistivity (i.e., they are less susceptible to eddy-current losses) and lower density. If sintered magnets are employed, it is preferably to provide a slit for the magnets so as to minimize the eddy-currents accumulating on their major surfaces.

Figure 6:
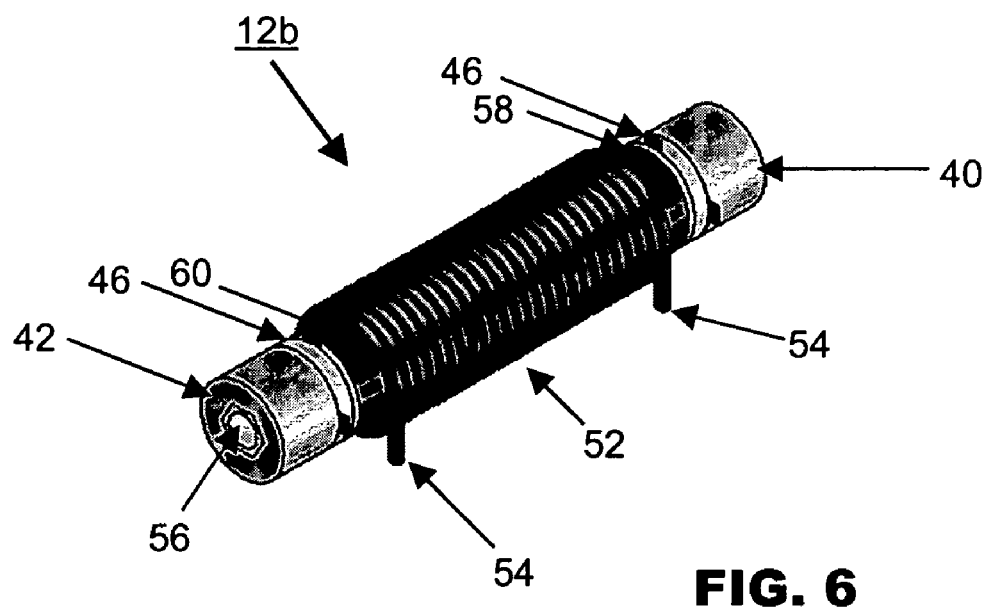
FIG. 6 is an isometric view of the force actuator and sensor unit assembled from the components illustrated in FIG. 5.
Figure 7:
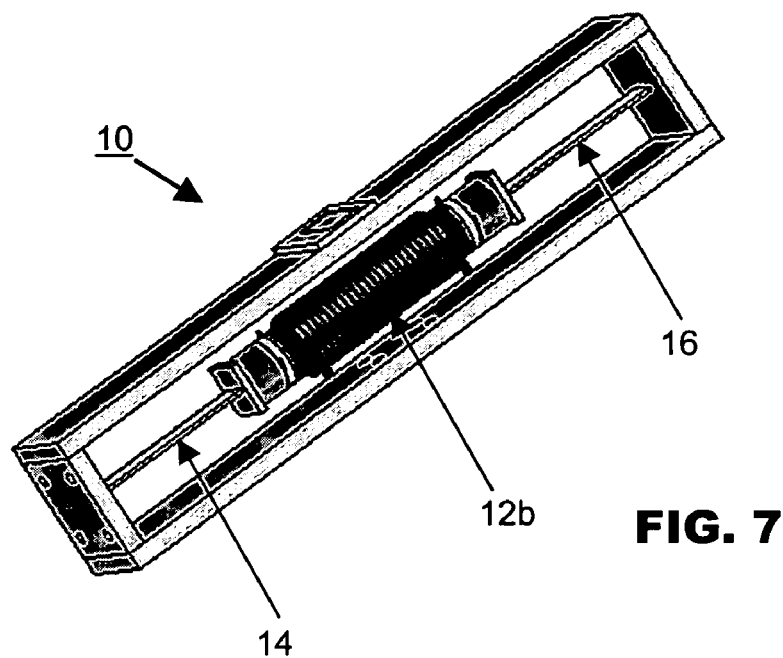
FIG. 7 is an isometric view of a tunable vibration absorption device including the force actuator and sensor unit of FIG. 6 enclosed in a rigid frame.

The actuator 50, the permanent magnets 58, 60, and the coil 52 and its leads 54 form the force actuator mechanism of the force actuator and sensor unit 12b. The permanent magnets 58, 60 provide a DC magnetic bias field to the actuator 50 for producing an initial static axial actuation force so that the force actuator mechanism of the force actuator and sensor unit 12b can further be magnetically driven about this initial static axial actuation force by a DC signal from the controller unit 34. The copper foils 44, sensors 46 and insulation layers 48 form the force sensor mechanism of the force actuator and sensor unit 12b that is used to monitor the change of the axial actuation force acting on the beams 14, 16. The controller unit 34 monitors the axial actuation force signal produced by the force sensor mechanism and tunes the force actuator mechanism through adjustment signals. The two rigid end plates 40, 42 are used to protect the sensors 46 from damage and provide connection interfaces between the transverse beams 14, 16 and the force actuator mechanism and force sensor mechanism. The bolt 36, washer 38, and nut 56 together provide a preload force to the actuator 50. FIG. 6 is an isometric view of the force actuator and sensor unit 12b assembled from the components illustrated in FIG. 5, and FIG. 7 is an isometric view of a tunable vibration absorption device 10 including the force actuator and sensor unit 12b of FIG. 6 enclosed in a rigid frame.

The main difference between the force actuator and sensor unit 12a of the first embodiment and the force actuator and sensor unit 12b of the second embodiment is that, in the second force actuator and sensor unit 12b, there are permanent magnets 58, 60 located between the force actuator mechanism and the force sensor mechanism to produce an initial DC magnetic bias field to the actuator 50 for producing an initial static axial actuation force. For the second force actuator and sensor unit 12*b*, if a controllable magnetic field that is applied though the coil 52 by the controller unit 34 is in the same direction as the initial DC magnetic bias field generated by the permanent magnets 58, 60, the resulting strength of the two magnetic fields increases, and the force actuator mechanism will expand and produce a relatively compressive axial actuation force to the transverse beams 14, 16. The effect is similar to what as seen in the first embodiment. If the controllable magnetic field is applied in an opposite direction to the DC magnetic bias field created by the permanent magnets 58, 60, the resulting strength of the two magnetic fields decreases. Therefore, the actuator part contracts and produces a relatively tensile axial actuation force to the transverse beams 14, 16.

Figure 8:
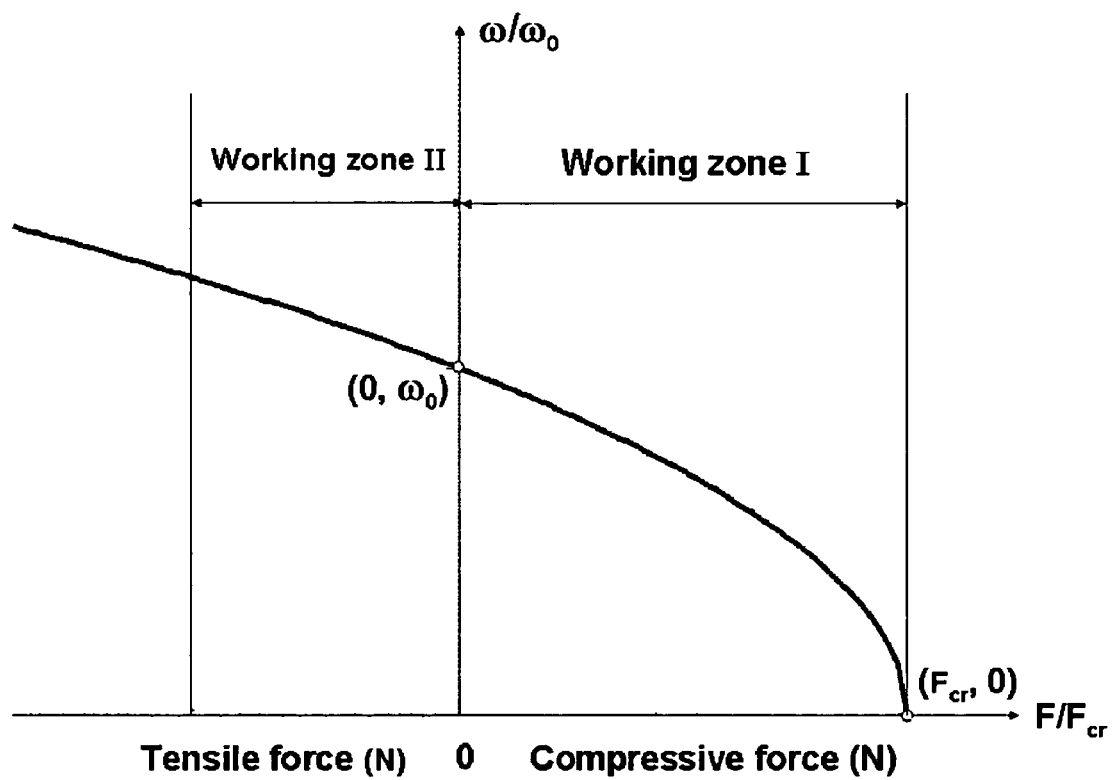
FIG. 8 is a graphical illustration showing a relationship between transverse frequency ratios and force ratios of exemplary tunable vibration absorption devices made according to the preferred embodiments of the invention.

FIG. 8 is a graphical illustration showing a relationship between transverse frequency ratios and force ratios of exemplary tunable vibration absorption devices 10 made according to the preferred embodiments of the invention. The transverse frequency ratio comprises an operational or a natural resonance frequency of a tunable vibration absorption device 10 with an axial actuation force over an operational or a natural resonance frequency of the tunable vibration absorption device 10 without an axial actuation force. The force ratio comprises an axial actuation force over a critical axial actuation force for the tunable vibration absorption device 10 having two identical transverse beams 14, 16. The tunable vibration absorption device 10 comprising the force actuator and sensor unit 12*a* according to the first preferred embodiment works in zone I of the graph because the force actuator and sensor unit 12*a* can only produce a compressive axial actuation force. The tunable vibration absorption device 10 using the force actuator and sensor unit 12*b* according to the second preferred embodiment works in both zones I and II of the graph to realize bi-directional tuning because the unit 12*b* can produce both compressive and tensile axial actuation forces.

Figure 9:
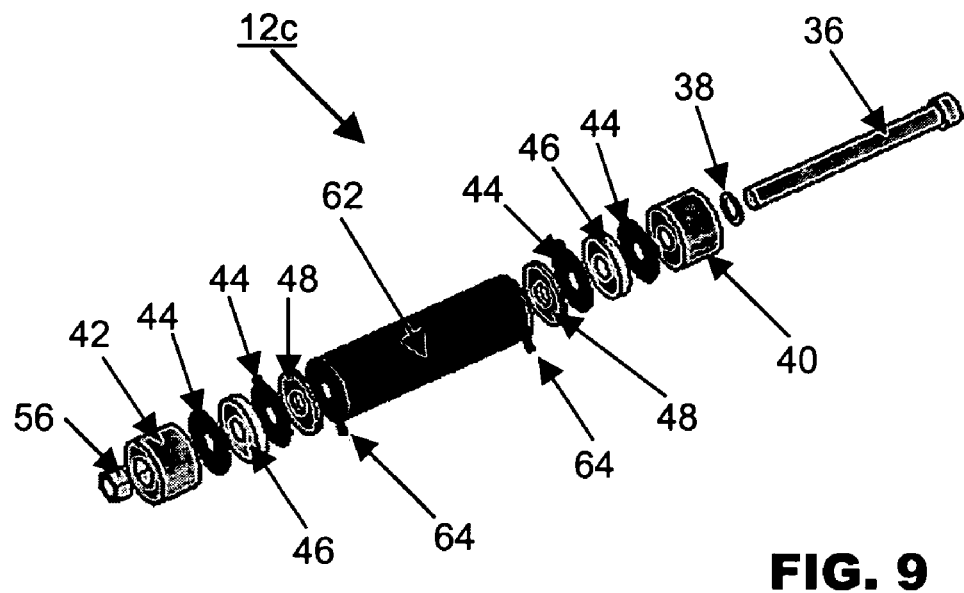
FIG. 9 is an exploded isometric view showing the components of a force actuator and sensor unit according to a third preferred embodiment of the invention.

FIG. 9 is an exploded isometric view showing the components of a force actuator and sensor unit 12*c* according to a third preferred embodiment of the invention. The components of the force actuator and sensor unit 12*c* are a bolt 36, a washer 38, two rigid end plates 40, 42, copper foils 44 sandwiching a pair of sensors 46, two pieces of insulation layers 48, an actuator in the form of a rod or bar 62 with leads 64, and a nut 56. The actuator 62 and sensors 46 are made of piezoelectric materials, which are preferably but not exclusively piezoelectric ceramics, such as PZT, $BaTiO_3$, PMN—PT, PZN—PT, or the like. The actuator 62 preferably consists of at least one piezoelectric ceramic multilayer stack connected electrically in parallel and mechanically in series with its internal polarization direction oriented along the axial direction of the force actuator and sensor unit 12*c*. The actuator 62 also preferably consists of a plurality of monolithic piezoelectric rings, tubes, disks or plates connected electrically in parallel and mechanical in series with its internal polarization direction oriented along the axial direction of the force actuator and sensor unit 12*c*. The sensors 46 preferably consist of an internal polarization direction oriented along the axial direction of the force actuator and sensor unit 12*c*. The insulation layers 48 are made of polymeric materials, which are preferably but not exclusively polyimide.

Figure 10:
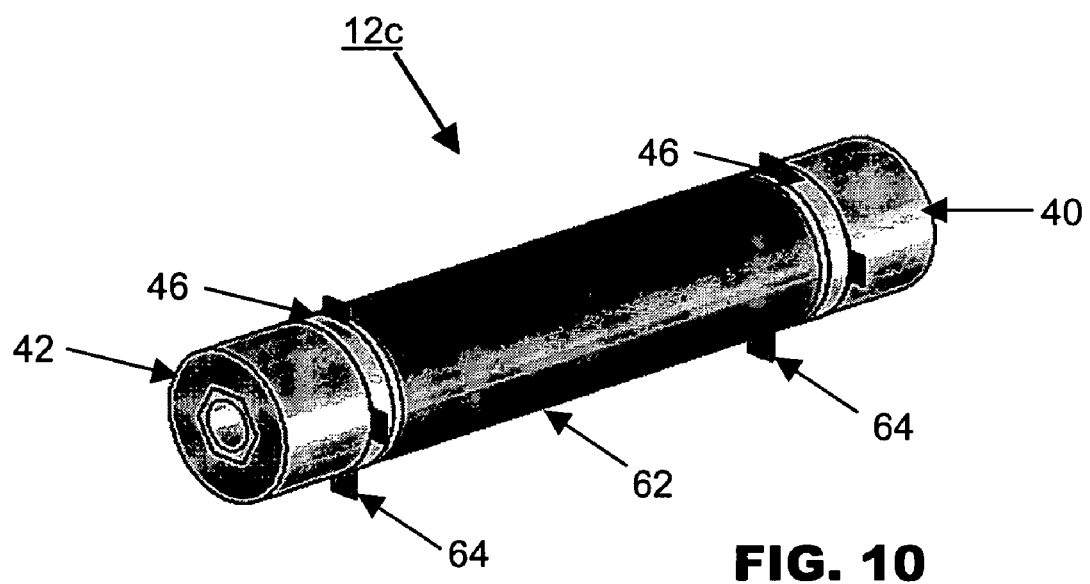
FIG. 10 is an isometric view of the force actuator and sensor unit assembled from the components illustrated in FIG. 9.
Figure 11:
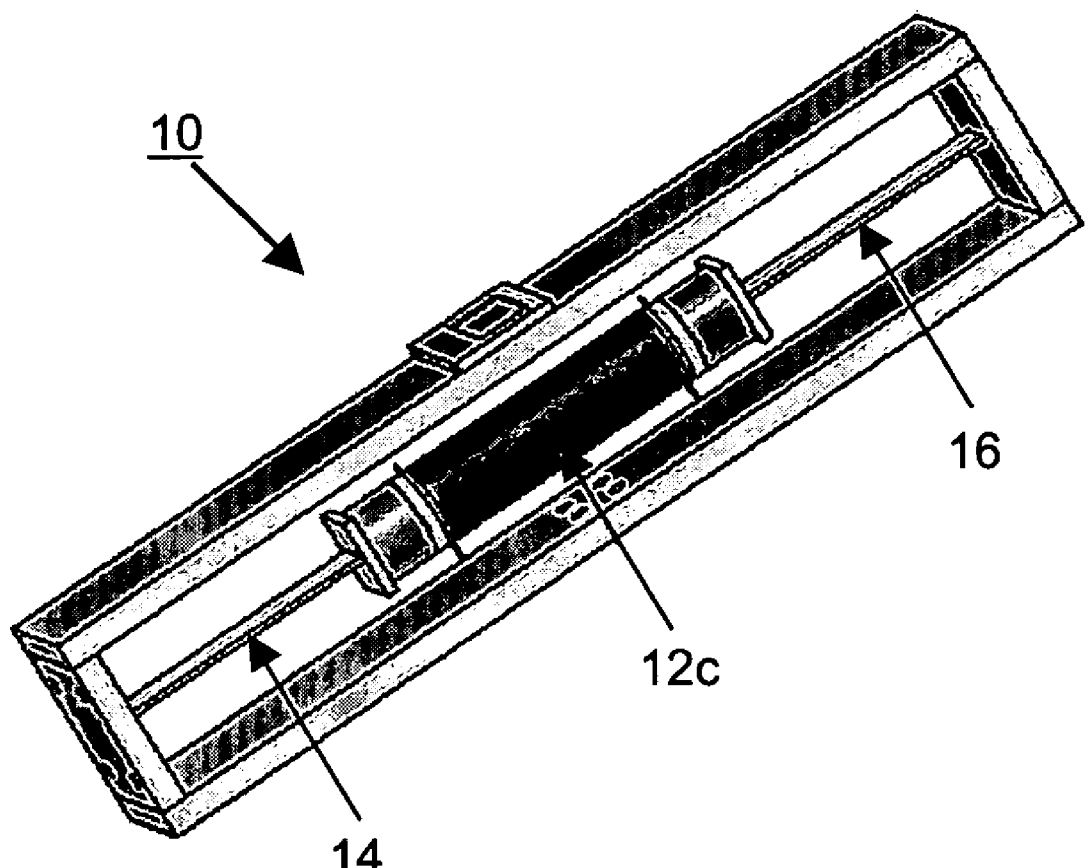
FIG. 11 is an isometric view of a tunable vibration absorption device including the force actuator and sensor unit of FIG. 10 enclosed in a rigid frame.

The actuator 62 and the leads 64 form the force actuator mechanism of the force actuator and sensor unit 12*c* that is electrically driven by a DC signal from the controller unit 34. The copper foils 44, sensors 46 and insulation layers 48 form the force sensor mechanism of the force actuator and sensor unit 12*c* that is used to monitor the change of the axial actuation force acting on the beams 14, 16. The controller unit 34 monitors the axial actuation force signal produced by the force sensor mechanism and tunes the force actuator mechanism accordingly through adjustment signals. The two rigid end plates 40, 42 are used to protect the sensors 46 from damage and to provide connection interfaces between the transverse beams 14, 16 and the force actuator mechanism and the force sensor mechanism. The bolt 36, washer 38, and nut 56 together provide a preload force to the actuator 62. The tunable vibration absorption device 10 using the force actuator and sensor unit 12*c* according to this third embodiment works in both zones I and II as shown in FIG. 8. The reason is that piezoelectric materials such as piezoelectric ceramics can change their shapes in response to an electrical signal and can respond to an applied load by producing an electrical signal. Thus, if a controllable electric field that is applied through the leads 64 by the controller unit 34 is in opposite direction to the internal polarization direction of the actuator 62, the force actuator mechanism will expand and produce a compressive axial actuation force acting on the transverse beams 14, 16. If the controllable electric field is applied in the same direction as the internal polarization direction of the actuator 62, the actuator part will contract and produce a tensile axial actuation force acting on the transverse beams 14, 16. FIG. 10 is an isometric view of the force actuator and sensor unit 12*c* assembled from the components illustrated in FIG. 9, and FIG. 11 is an isometric view of a tunable vibration absorption device 10 including the force actuator and sensor unit 12*c* of FIG. 10 enclosed in a rigid frame.

It would be appreciated that an advantage of the tunable vibration absorption devices 10 according to the preferred embodiments of the invention is that the vibration absorption devices are easy to automatically tune since the tuned frequency depends on the direction and magnitude of the axial actuation force exerted by the force actuator mechanisms of the devices, but not on the structure of the devices. These tunable vibration absorption devices 10 can also be tuned both uni-directionally and bi-directionally. When an axial actuation force acting on the device is a compressive force, the operational frequency (that is, the resonance frequency) of the device 10 can be tuned to be decreased. This is particularly important for vibration control at low frequencies. When the axial actuation force is a tensile force, the operational frequency (that is, the resonance frequency) of the device 10 can be tuned to increase correspondingly.

The use of embedded force sensors to monitor the change of axial actuation force can determine the operational frequency of the device. The use of these embedded sensors to replace externally installed accelerometers and/or force sensors has the advantage that accuracy is improved since the mass of embedded sensors has been taken into account in the determination of the operational frequency. The cost is also significantly lower. Furthermore, since the controller unit 34 is directly connected to the leads/signal cables of the force actuator and sensor unit 12, adaptive tuning in real time can be achieved.

Overall, the tunable vibration absorption devices 10 according to the preferred embodiments of the invention require fewer components, and these components can be assembled relatively easily. This leads to easier manufacturing and lower cost.

The invention described herein is susceptible to variations, modifications and/or additions other than those specifically described and it is to be understood that the invention includes all such variations, modifications and/or additions which fall within the spirit and scope of the above description.

The invention claimed is:

1. A tunable vibration absorption device comprising:
a stack including a force actuator mechanism operable to generate an axial actuation force and a force sensor mechanism operable to generate a force signal in response to an external force acting on the stack, the stack further including an insulation layer positioned between the force actuator mechanism and the force sensor mechanism;
a compression assembly for compressing the stack and providing a preload force to the force actuator mechanism; and
a controller unit electrically connected to the force sensor mechanism for receiving the force signal generated by the force sensor mechanism, wherein the controller unit is also electrically connected to the force actuator mechanism for adjusting the axial actuation force generated by the force actuator mechanism in response to the received force signal generated by the force sensor mechanism.

2. The tunable vibration absorption device according to claim 1, wherein the force actuator mechanism comprises a piezoelectric material having its internal polarization direction orientated along an axial direction of the stack.

3. The tunable vibration absorption device according to claim 2, wherein the piezoelectric material is selected from the group consisting of: lead zirconate titanate, barium titanate, lead magnesium niobate-lead titanate and lead zirconate niobate-lead titanate.

4. The tunable vibration absorption device according to claim 1, wherein the insulation layer comprises a polymeric material.

5. The tunable vibration absorption device according to claim 1, further comprising a magnetic material positioned between the force actuator mechanism and force sensor mechanism for producing a magnetic bias field.

6. The tunable vibration absorption device according to claim 5, wherein the magnetic material is selected from the group consisting of: monolithic sintered neodymium, polymer-bonded neodymium and samarium cobalt.

7. A tunable vibration absorption device comprising:
a stack including a force actuator mechanism operable to generate an axial actuation force and a force sensor mechanism operable to generate a force signal in response to an external force acting on the stack;
a controller unit electrically connected to the force sensor mechanism for receiving the force signal generated by the force sensor mechanism, the controller unit being also electrically connected to the force actuator mechanism for adjusting the axial actuation force generated by the force actuator mechanism in response to the received force signal generated by the force sensor mechanism; and
resilient links coupled to axial ends of the stack, the resilient links being operable to connect the stack to a structure to be damped, wherein the resilient links are relatively sensitive in a direction transverse to the axial actuation force generated by the force actuator mechanism but relatively insensitive in directions parallel to the axial actuation force.

8. The tunable vibration absorption device according to claim 7, wherein the resilient links comprise flexible transverse beams.

9. A tunable vibration absorption device comprising:
a stack including a force actuator mechanism operable to generate an axial actuation force and a force sensor mechanism operable to generate a force signal in response to an external force acting on the stack, the force actuator mechanism and the force sensor mechanism having holes therethrough;
a compression assembly for compressing the stack and providing a preload force to the force actuator mechanism, the compression assembly comprising a bolt that extends through the holes of the force actuator mechanism and the force sensor mechanism, the compression assembly also comprising a nut to secure the force actuator mechanism and the force sensor mechanism to the bolt; and
a controller unit electrically connected to the force sensor mechanism for receiving the force signal generated by the force sensor mechanism, wherein the controller unit is also electrically connected to the force actuator mechanism for adjusting the axial actuation force generated by the force actuator mechanism in response to the received force signal generated by the force sensor mechanism.

10. The tunable vibration absorption device according to claim 9, further comprising rigid supports for supporting the stack, wherein the rigid supports include a mounting device mounting the tunable vibration absorption device to a structure to be damped.

11. The tunable vibration absorption device according to claim 9, wherein the force actuator mechanism comprises a magnetostrictive material.

12. The tunable vibration absorption device according to claim 11, wherein the magnetostrictive material is selected from the group consisting of: terbium-dysprosium-iron alloy, gallium-iron alloy and samarium-dysprosium-iron alloy.

13. The tunable vibration absorption device according to claim 11, wherein the magnetostrictive material comprises an internal magnetization direction that is oriented along an axial direction of the stack.

14. The tunable vibration absorption device according to claim 11, further comprising a coil surrounding the magnetostrictive material for generating a magnetic field to magnetically drive the material.

15. The tunable vibration absorption device according to claim 9, wherein the force sensor mechanism comprises a piezoelectric-based force sensor.

16. The tunable vibration absorption device according to claim 15, wherein the piezoelectric-based force sensor is made from a material selected from the group consisting of: lead zirconate titanate, barium titanate, lead magnesium niobate-lead titanate and lead zirconate niobate-lead titanate.

17. The tunable vibration absorption device according to claim 15, wherein the piezoelectric-based sensor comprises an internal polarization direction that is orientated along an axial direction of the stack.

18. The tunable vibration absorption device according to claim 9, wherein the force sensor mechanism comprises a first force sensor and a second force sensor positioned on opposite sides of the force actuator mechanism.

* * * * *